(12) United States Patent
Peters (10) Patent No.: US 7,707,512 B2
(45) Date of Patent: Apr. 27, 2010

(54) CONTEXT SWITCHING AND METHOD

(75) Inventor: Johan C. Peters, Sankt Leon-Rot (DE)

(73) Assignee: SAP AG, Walldorf (DE)

( * ) Notice: Subject to any disclaimer, the term of this patent is extended or adjusted under 35 U.S.C. 154(b) by 275 days.

(21) Appl. No.: 11/319,438

(22) Filed: Dec. 29, 2005

(65) Prior Publication Data

US 2007/0156483 A1 Jul. 5, 2007

(51) Int. Cl.
*G06F 3/048* (2006.01)

(52) U.S. Cl. .................. 715/779; 715/853; 715/825; 715/817

(58) Field of Classification Search ............... 715/779, 715/853, 825, 817
See application file for complete search history.

(56) References Cited

U.S. PATENT DOCUMENTS

| | | | |
|---|---|---|---|
| 5,742,285 A * | 4/1998 | Ueda | 715/778 |
| 6,204,847 B1 * | 3/2001 | Wright | 715/804 |
| 6,268,853 B1 * | 7/2001 | Hoskins et al. | 700/83 |
| 6,418,458 B1 * | 7/2002 | Maresco | 718/103 |
| 7,054,888 B2 * | 5/2006 | LaChapelle et al. | 707/104.1 |
| 7,134,094 B2 * | 11/2006 | Stabb et al. | 715/827 |
| 7,191,443 B2 * | 3/2007 | Kubooka et al. | 718/100 |
| 7,310,729 B2 * | 12/2007 | Gordon et al. | 713/161 |
| 2005/0188329 A1 * | 8/2005 | Cutler et al. | 715/804 |
| 2007/0150389 A1 * | 6/2007 | Aamodt et al. | 705/35 |

OTHER PUBLICATIONS

Wikipedia: Threading.*

* cited by examiner

*Primary Examiner*—Rachna S Desai
*Assistant Examiner*—Soumya Dasgupta
(74) *Attorney, Agent, or Firm*—Kenyon & Kenyon LLP (57) ABSTRACT

Systems and methods for context switching within enterprise resource planning systems are contemplated, including a first and second user context. A user performing tasks in the first user context actuates an actuator in communication with a context switcher. The context switcher changes the user's user context from the first user context to the second user context in response to an event. The user is then able to perform tasks in the second user context.

18 Claims, 4 Drawing Sheets

CONTEXT SWITCHING AND METHOD

FIELD OF THE INVENTION

This invention relates to customizable input devices and more specifically to input devices for ERP systems.

BACKGROUND

Enterprise relationship planning tools tie different departmental applications together within a company. For example, ERP systems allow changes by the human resources department to an employee's vacation time to be seen by the accounting department to adjust the employee's pay accordingly. A call center department benefits from ERP systems by allowing a call representative to view and update a customer's information in the company's records. Typically, in large companies, each individual application within the ERP system is used by one individual or set of individuals. However, small to medium sized companies often require employees to perform various roles within a company. A CFO may oversee the accounting department, and at the same time, handle the human resources function. A receptionist may field and direct incoming calls and serve as a secretary.

Performing various tasks across departmental functions often requires an individual to switch between departmental applications. Today, these multitasking individuals are required to switch between different applications on their computer to address the needs of the respective departmental functions. Otherwise, the individuals use multiple, distinct systems, one for each departmental function. Hunting through the various running applications to locate the one to serve the current need can waste valuable resources. This can most clearly be seen when the individual must process a large number of tasks on various departmental applications. Each context switch requires time and slows the individual down. The disadvantages of tedious context switching processes become particularly acute when an employee must perform call center functions that require real time response to company customers. Customers are indifferent to the needs of small to medium-sized businesses (such as the delay associated with a multitasking operator searching for the right application to serve the customer's need). They expect the same type of support they are accustomed to receiving from the business's larger competitors.

To illustrate, a customer service representative in a small to medium-sized software company may also perform software development functions. Engaged in development, the employee may receive an incoming call from a customer attempting to return a product. The developer must locate and run the appropriate applications needed to address the customer return, such as an accounting program to adjust for the cost of the returned product, a stockroom application to adjust for the incoming product, a user account program to reflect that the user will no longer be a customer, and a database program to deactivate the user's on-line account. Delays associated with searching for and launching these appropriate applications may cause the customer to wait an exorbitant amount of time. What's more, the developer's productivity would suffer because of the extended time in launching the appropriate applications. Keeping a separate computer at each developer's work station that also fields incoming calls raises costs. Small to medium-sized companies with tight budgets cannot afford such luxuries. Keeping all of the appropriate applications open on the developer's computer clutters the developer's screen, reducing efficiency, and further still requires searching through the numerous, open applications for the appropriate application to address the customer's needs.

Therefore, a need exists for a system and method for efficiently switching between different applications within ERP systems. Various hardware and software devices allow an application to be switched in response to an event. Hotkeys on keyboards may launch various applications. Incoming mail may be automatically displayed to the user when it arrives. This functionality allows users to quickly change applications to perform new tasks. Such a system may be suited to solve the problem of efficient context switching.

DETAILED DESCRIPTION

In an ERP system, where a user is required to perform various tasks in various applications, it is desirable to have an efficient system and method for context switching. The user performs tasks within a first user context (such as a word processor application). An actuator is in communication with a context switcher. When a user actuates the actuator, the context switcher automatically activates a second user context associated with that actuator and deactivates the first user context so that the user may perform tasks in the second user context.

Figure 1:
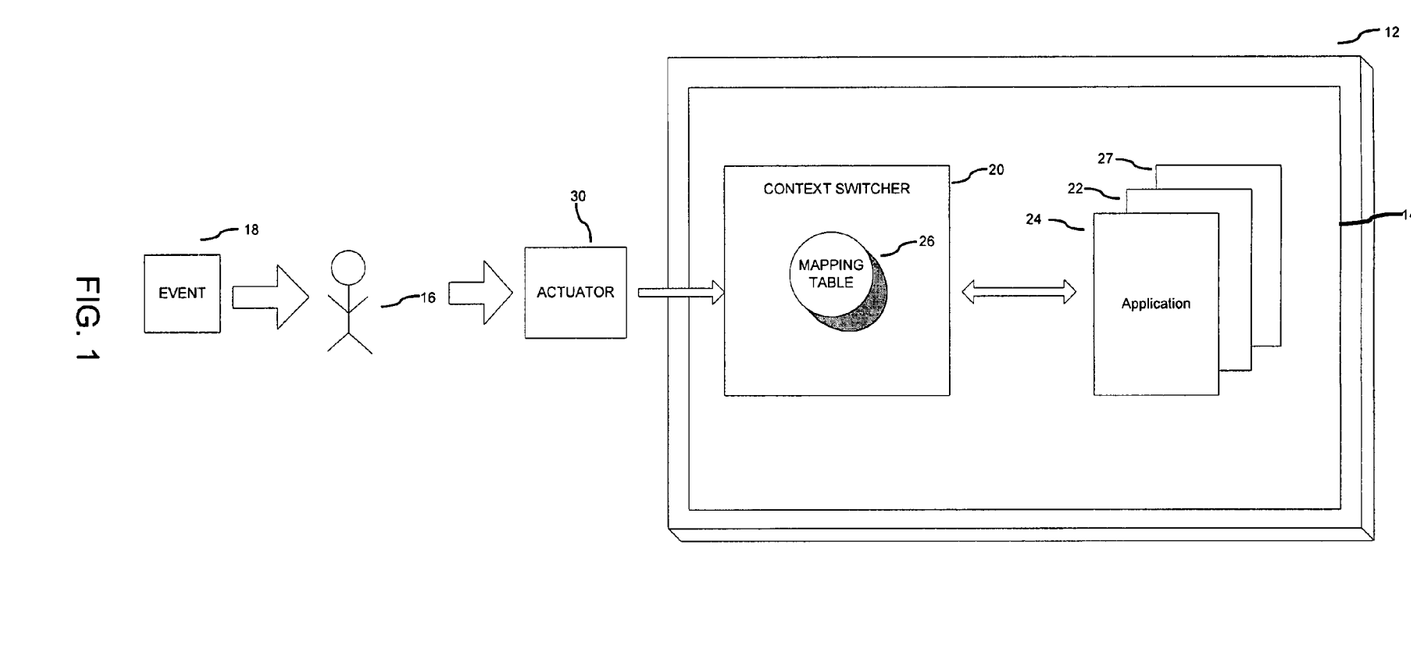
FIG. 1 depicts an illustrative block diagram of the present invention.

FIG. 1 depicts a block diagram of one embodiment of a customizable context switching system 10 of the present invention containing a computing device 12 and a computing environment 14 disposed within the computing device 12, and user contexts 22 and 24. A user 16 performs tasks within the user context 22 and the user context 24. A context switcher 20 is disposed within the computing environment 14 and contains a mapping table 26 that maps actuator identifiers with user context identifiers. An actuator 30 is in communication with the context switcher 20.

The computing device 12 may be any appropriate multitasking computing platform well known in the art including, e.g., a processing device or processor used to carry out various tasks. For purposes of this description, the computing device 12 is a personal computer. A personal computer may include a processor and a memory. The memory may include one or more of RAM, ROM, hard disk drive or other computer-readable storage medium. The computing environment 14 may be a multitasking environment that allows the user 16 to run various applications on the computing device 12 simultaneously, such as the Windows operating system from Microsoft Corporation. Applications consist of tools that allow a user to perform various tasks with the computing device 12. For example, a word processing application may allow a user to create and edit written documents. A call center application may allow a customer service representative to examine a customer's data and to make changes to that data. The multitasking nature of the computing environment 14 allows applications to be run simultaneously. The user 16 can switch between applications or application contexts and/or data objects depending on the task the user is performing.

The multitasking computer environment 14 may even allow applications to perform tasks in the background. For example, when the user 16 is using the call center application, the word processor application may print a document in the background.

The user contexts 22 and 24 may be instances of functionality found within applications. A user context may be a portion of functionality of a given application or may consist of the total functionality of the application. For example, in a word processing application, one user context may allow the user to edit a document. Another user context may allow a user to look up help information on a particular feature within that word processing application. Still further, another user context may be a second instance of the word processing application that allows the user to edit a second document. A user context may also consist of the word processing application itself, including the two document editing portions and the help portion. For illustrative purposes and not by way of limitation, the user context 22 will be a word processing application and the user context 24 will be a call center application.

The user contexts 22 and 24 may exist under the umbrella of an ERP system. For example, the user 16 may use the user context 22 to edit a marketing report that is to be sent to prospective customers. The user 16 may simultaneously use the user context 24 to field an incoming call and add a new marketing contact to a database of contacts that the marketing report is destined for. The word processing application may later import a list of marketing contacts from the marketing database and print address labels for each contact. The ERP system makes the user contexts within its umbrella interoperable. The ERP system does not require the user contexts to interact, but merely enables that functionality.

The context switcher 20 may switch a user's context from one user context to another user context. Multiple user contexts may exist simultaneously within the computing environment 14, at any given time, a single user context will be active. When a user context is active, the user 16 can perform tasks within that user context. When a user context is inactive, the user is unable to perform tasks in that user context, but the user context may perform tasks itself as described above. To illustrate, when the user 16 is editing a document in a word processor user context, that word processor user context may be active and may be the focus on the user's 16 screen. The user 16 may receive incoming email and switch to the email program to read the message. After the switch, the email program user context may become the focus of the user's 16 tasks and may be the active context. The word processor context may be placed in the background. The word processor user context may continue to print a file while in the background.

The user 16 may switch the current user context by actuating an actuator. Actuating the actuator may thereby perform an operation on the currently active user context. The context switcher may deactivate the user context and activate another user context in its place or deactivate the current user context and replace it with another user context. For example, the user 16 may be editing the marketing report within the user context 22. When the user 16 receives an incoming call, the user 16 may actuate the "call center" actuator. The context switcher 20 may thereby activate the call center user context of the user context 24. This may cause the context switcher 20 to bring the user context 24 into focus so that the user may see the caller's information and may deactivate the word processing user context that the user 16 was previously working in. The context switcher 20 may be an application running within the computing environment 14 that is capable of activating new user contexts, switching between already open user contexts, or terminating user contexts. The context switcher 20 may run in the background and may not be accessible by the user directly, aside from configuration and set up.

The context switcher may be triggered by the event 18 when the user 16 actuates an actuator 30. First, the user 16 receives an event 18. The event 18 may be various real-world occurrences. For example, the user 16 may receive a call on the telephone. The call may require the user 16 to look up a caller's information in the database. Second, the user 16 may actuate an actuator in order to activate the proper user context to address the task of looking up the caller's information. The actuator 30 may be any actuator well known. For example, the actuator 30 may be a button on a keyboard, a button on a mouse, a touchpad, an aural sensor, a system that tracks eye movements, and the like. For illustrative purposes, the actuator 30 is a button on a keyboard.

An actuator may be customizable depending on what behavior the user intends for that actuator. For example, an actuator may launch a call center application, close the call center application, switch to an already running call center application, or activate a different user context. A configuration program may be run that allows a mapping between actuator and context manipulation operation to be configured. There are various ways to configure actuators. For example, a configuration program may be run that allows the user to assign operations to keys on a keyboard much as multimedia computer keyboards allow users to assign predefined keys to raise and lower the computer's volume, launch applications, and the like.

An actuator may be in communication with the context switcher 20, for example, over USB, over a network, via wireless communications, and the like. For illustrative purposes, the actuator 30 communicates with the context switcher 20 through a keyboard connected to the computing device 12.

Next, the user 16 may press the appropriate button, the actuator 30, in order to activate the call center user context, the user context 24. Pressing the actuator 30 may generate data that is sent from the actuator 30 to the context switcher 20. The data may contain an actuator identifier 30*a* for the actuator 30 that the context switcher 20 may use to look up the user context associated with the actuator 30. The context switcher 20 may look up the actuator identifier 30*a* in the mapping table 26.

The mapping table 26 may be any appropriate data store that is capable of storing relationships between actuator identifiers and user contexts. This may include, but is not limited to, array data structures, linked lists, relational databases, and the like. The context switcher may activate user contexts. For example, the context switcher may itself launch a new thread that encapsulates the user context 24. Alternatively, the context switcher may pass the identifier of the user context 24 to a separate application responsible for switching the user's 16 user context to the user context 24.

The context switcher 20 may also terminate user contexts in addition to switching between active contexts and activating new user contexts. For example, the actuator 30 may be a button that closes the call center user context when the user is done processing the incoming call. The context switcher 20 may receive the data and retrieves the user context identifier for the user context 24 associated with the actuator 30. The context switcher 20 may pass the user context identifier to the computing environment 14. The computing environment 14 may locate the user context 24 in the list of running user contexts. The computing environment 14 may then send a terminate event to the user context 24. The terminate event may be any termination event. For example, the context switcher 20 may send a signal interrupt to the user context 24 which tells the user context 24 to terminate. Alternatively, the context switcher 20 may place a terminate system event in a waiting queue of system events that the system event handler of the user context 24 picks up. The user context 24, after receiving the terminate system event, may close the user context 24. The context switcher may then switch the user's 16 active context to the last active user context prior to the context switcher switching to the user context 24.

The context switcher 20 may terminate the user context 24 and all of its child user contexts in one operation. The user context 24 may be associated with various child user contexts. For example, a word processor user context may contain child user contexts for printing, help, and network communications with other word processors over a network. Alternatively, a parent user context may spawn new threads to handle other tasks within the parent user context, such as an email program to email the document. When the user context 24, the parent of various child user contexts, closes, the child contexts may automatically be closed. The computing environment 14 may track relationships between parent and child contexts in various ways. For example, the computing environment 14 may maintain a user context table. Each time a new user context is started, the computing environment 14 may create an entry in the user context table. Each time a user context spawns a child, the computing environment 14 may modify the user context's table entry to hold the child user context's identifier.

The user context 24, the call center user context, may be started when the user 16 receives an incoming call. The computing environment 14 may create a user context table entry for the user context 24 when it is launched. The user 16 may then instruct the user context 24 to launch an accounting user context to modify various billing discrepancies within the caller's account. The accounting user context is a child user context of the user context 24. The computing environment 14 may add the user context identifier of the accounting user context to the table entry for the user context 24 in the user context table. The user 16 may then actuate the actuator to close the user context 24 and all of its child user contexts. The context switcher 20 may query the user context table to return all child user context identifiers associated with the user context 24. The context switcher 20 may then terminate each child user context of the user context 24, starting with the lowest level child user context. The context switcher may then terminate the user context 24 and switch the user's 16 user context to the previously active user context.

The context switcher may perform a variety of context manipulation operations in response to the actuator being actuated. For example, the context switcher may activate a new user context, switch to a different user context than the currently active user context, terminate a user context, or terminate a user context and all child user contexts associated with that user context. Alternatively, the context switcher may perform a combination of context manipulation operations in response to the actuator being actuated. For example, the context switcher may activate two user contexts. The context switcher may also activate one user context and terminate another. Any combination of context manipulation operations may be accomplished by the present invention in response to the actuator being actuated.

Figure 2:
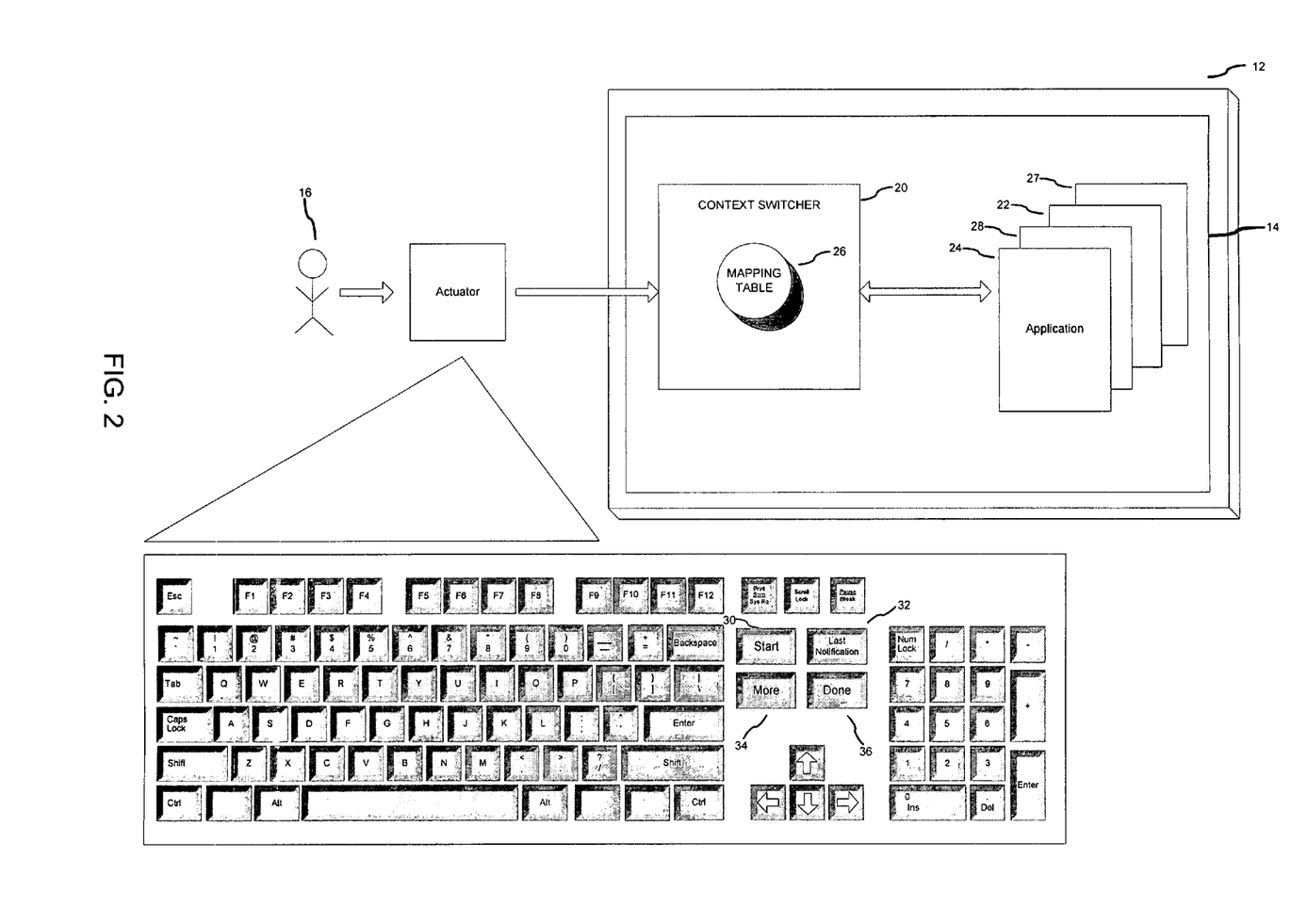
FIG. 2 depicts a sample input device of the present invention.

In another embodiment, a number of actuators may cause the context switcher 20 to activate various corresponding user contexts. The various actuators may be various buttons on a keyboard as shown in FIG. 2. These buttons may be dedicated buttons or may be buttons mapped especially to switch user contexts as shown in FIG. 2.

For example, the four buttons in FIG. 2 may be buttons to switch various user contexts needed by an individual to field customer service calls. The buttons may contain functionality as follows:

START (actuator 30): Opens the call center application at a "home page" of the call center application. The user 16 can navigate to any functionality within the call center application.

LAST NOTIFICATION (actuator 32): Brings up a summary record of a customer represented by an incoming call.

MORE (actuator 34): Expands the summary record from a truncated presentation to a full record view.

DONE (actuator 36): Closes the call center application and restores system state to the state that was reached prior to opening the call center application.

Initially, the user 16 may be editing a document within the user context 22. The user 16 may receive an incoming call and may press the "Start" button. Actuator 30 may send data to the context switcher 20. The context switcher 20 thereby may launch the call center application. The call center application is the user context 24. Launching the user context 24 may activate the user context 24 and may make the user context 24 the active user context. At the same time, launching the user context 24 may deactivate, but does not terminate, the user context 22. Once the user 16 determines that he needs to look up information in the caller's account, the user 16 presses the "LAST NOTIFICATION" button. This may display summary information in the caller's account. The portion of the call center application that displays a caller's information is user context 27. Activating the user context 27 may deactivate the user context 24. Activating the user context 26 may also cause the computing environment 14 to add the user context's 27 user context identifier to user context's 24 entry in the user context table. The computing device 12 may automatically extract information from a connected telephone system that allows it to display the account information for the correct caller.

The user 16 may press the "MORE" button after determining that he needs further information about the current caller. This may activate the user context 28, may deactivate the user context 27, and may add the user context's 28 user context identifier to the user context's 24 entry in the user context table. The user 16 may close the user context 28 when he has successfully updated the caller's account information. This thereby may deactivate the user context 28 and removes user context's 28 user context identifier from user context's 24 table entry. Since the user context 27 was the last active user context, the user context 27 becomes the active user context. The user 16 may press the "DONE" button when he hangs up with the caller, wishing to return to the user context 22. The computing environment 14 may deactivate the user context 24 and all child user contexts under it. The user context 27 may thereby be terminated because it is a child of the user context 24. The computing environment 14 may reactivate the user context 22 because the user context 22 was the last active user context prior to activating the user context 24.

Figure 3:
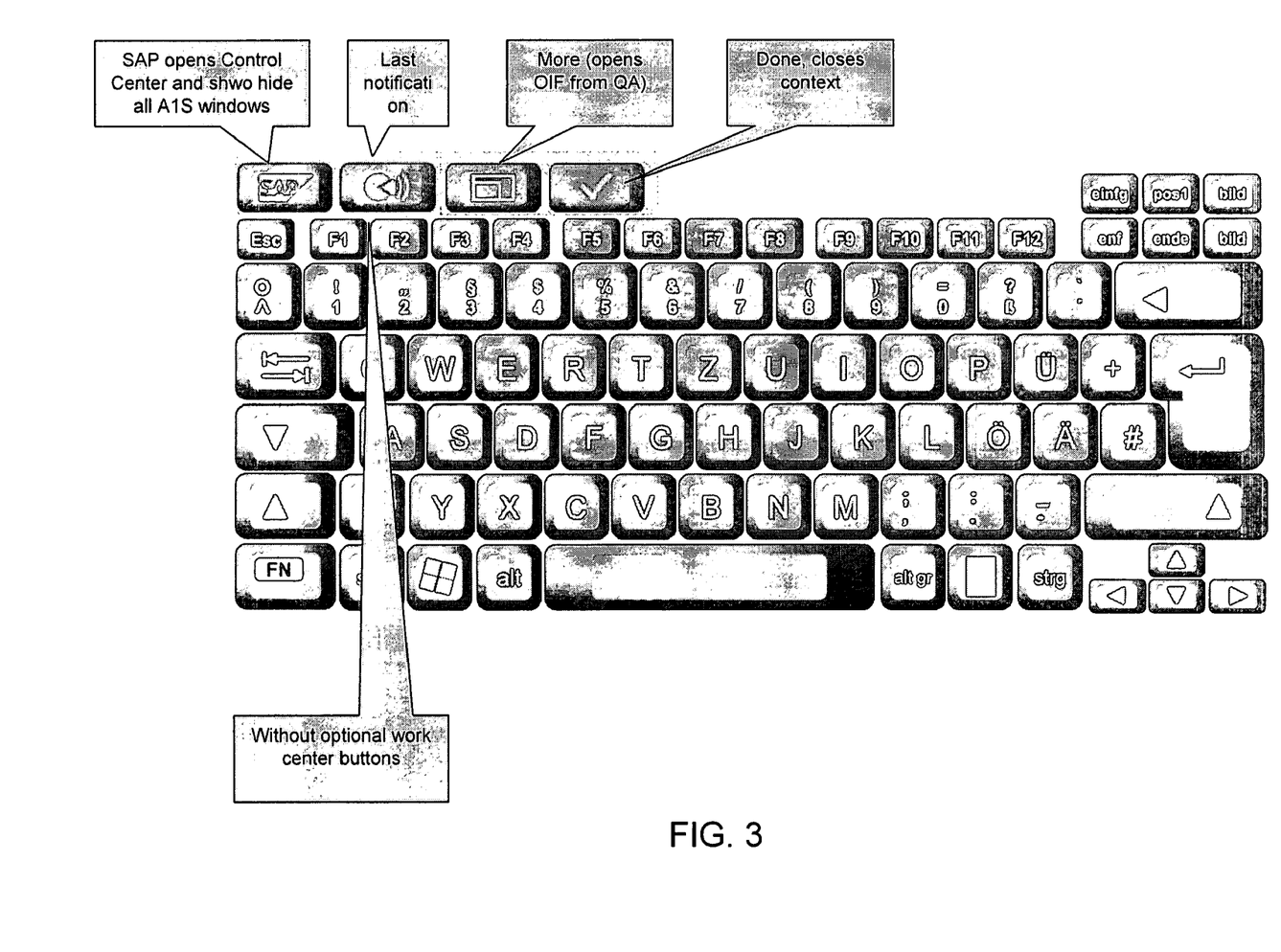
FIG. 3 depicts an exemplary input device of the present invention.

In another alternative embodiment, the input device may contain specialized actuators dedicated for context switching applications, as shown in FIG. 3.

In another alternative embodiment, the configuration program may be used to map actuators 30, 32, 34, and 36 to different context manipulation operations. The user may use the configuration program to change the order of the actuators to suit his needs. For example, the actuators may be buttons overlaid on an already existing keyboard. The user may use the configuration program to map the keys to the appropriate context manipulation operations as shown in FIG. 2. Alternatively, the user may remap the function keys F1-F4 with the operations previously associated with the buttons 1-4.

In another alternative embodiment, the computing device 12 may be a client-server system. The computing environment 14 may be a distributed computing environment. The distributed computing device 12 may be two computing devices connected over a network. The connected network may be a wired or wireless network. The distributed computing environment 14 may be operable to function over such a network. For example, the distributed computing device 12 may comprise a first computing device that may be connected to a second computing device over a network. The actuator 30 may be connected to the first computing device. A first portion of the distributed computing environment 14 may exist on the first computing device. The context switcher 20 may exist in a second portion of the distributed computing environment 14 on the second computing device, along with the mapping table 26. The first computer may run a distributed application to operably connect the first computing device and the second computing device. The application may pass all inputs from the first computing device to the second device and pass all screen updates from the second computing device to the first computing device such that the distributed system as a whole works much like a terminal-based system. The user contexts 22 and 24 may be running in the second portion of the distributed computing environment 14. Actuating the actuator 30 may pass the data over the network to the context switcher in the second portion of the distributed computing environment 14.

The second computing device and the second portion of the distributed computing environment 14 may be multitasking platforms. They may further be adapted to serve multiple users over a network. The second computing device may be capable of supporting multiple second portions of distributed computing environments. Multiple first portions of these distributed computing environments may be operably connected with their respective second portions such that the first portions and the second portions form complete computing environments. In this way, multiple distributed computing environments may be supported by a single computing device. Of course, more than two distributed computing devices may be connected to effectuate a computing device 12 of the present invention. Solutions within the distributed computer field may provide the platforms to support these more complex architectures.

In yet another alternative embodiment, some of the user contexts may be executed on the first computing device and some user contexts may be executed on the second computing device. The context switcher 20 may be distributed. A first portion of the distributed context switcher 20 may exist on the first computing device and may perform context manipulations on user contexts running on the first computing device. Likewise, a second portion of the distributed context switcher 20 may exist on the second computing device and may perform context manipulations on user contexts running on the second computing device. The first and second portions of the distributed context switcher 20 may communicate to keep track of what contexts are running on which computing device. A replicated mapping table 26 may be employed. The first portion of the distributed context switcher 20 may pass a request to the second portion of the distributed context switcher 20 when the first portion receives an operation to be taken on a user context running on the second computing device. In this way, the distributed systems may allow the user to switch to user contexts located in a distributed network. This allows the present solution to be operative to support context switching within a client-server environment as well.

Figure 4:
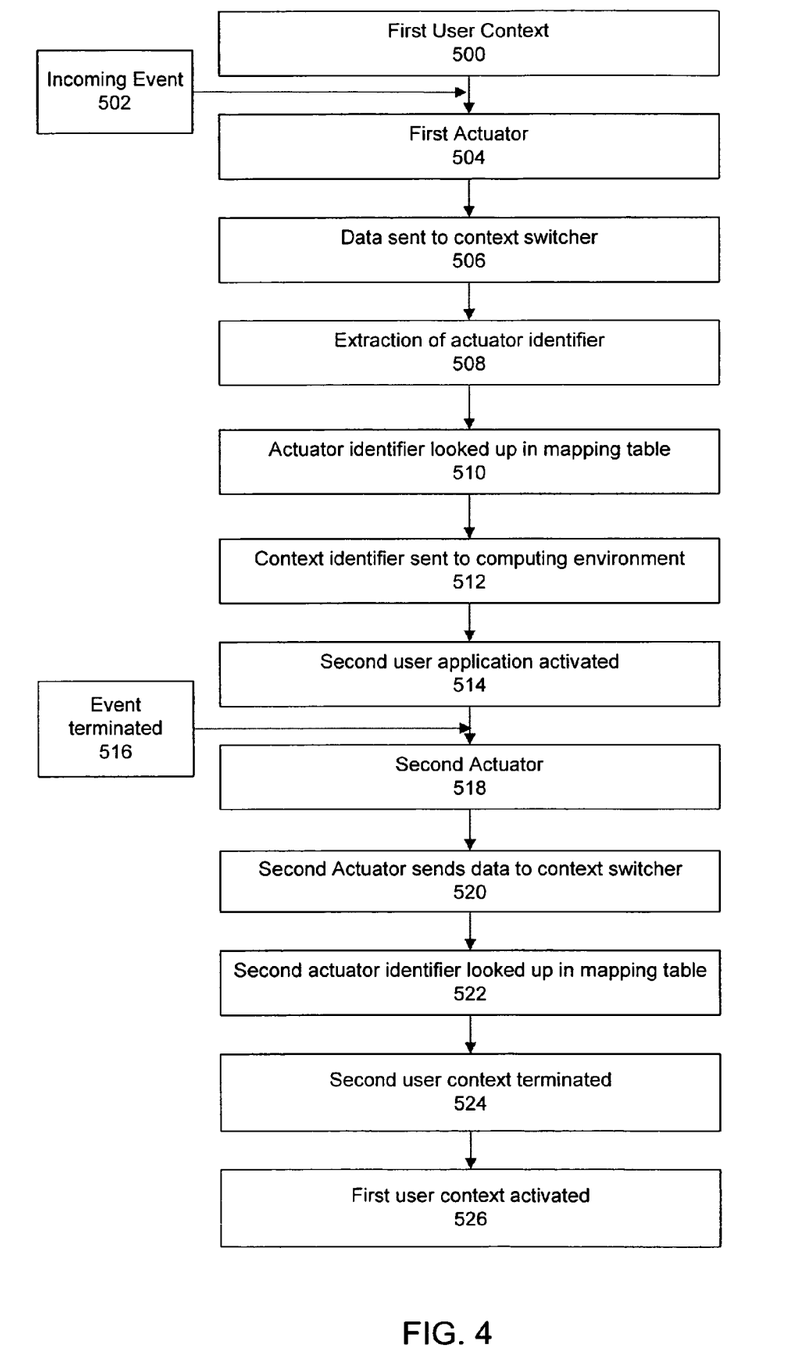
FIG. 4 depicts a flowchart of illustrative steps of the present invention.

Turning to FIG. 4, illustrative steps of the present invention are depicted. In step 500, a user may be performing tasks within a first user context. For purposes of this example, the user is editing a document within a word processor. In 502, the user receives an event. For this example the event is an incoming call. The user actuates a first actuator in step 504. The first actuator is the "START" button on a keyboard for launching a call center application. In step 506, the actuator sends data to a context switcher located in a computing environment on the user's computing device. The context switcher extracts the actuator identifier from the data in step 508. In 510, the context switcher uses the actuator identifier of the first actuator to look up a first user context associated with the actuator identifier in a mapping table.

The context switcher then sends the user context identifier to the computing environment in step 512. In 514, the computing environment starts the call center user application and activates a second user context. The first user context is the call center application. Activating the second user context automatically deactivates the first user context. The user can now perform tasks in the activated call center user context.

In an alternative embodiment, instead of launching the call center application, the context switcher may activate the second user context. This is possible because the second user context was already running previously. The context switcher was thus not required to launch the second user context.

In an alternative embodiment, the context switcher, instead of launching the call center application, may terminate the call center application and may reactivate the previously active user context. In step 516, the user receives a second event. The second event for this example is terminating the call with the caller. In 518, the user actuates a second actuator, a "DONE" button. In 520, the second actuator sends data to the context switcher containing the actuator identifier for the second actuator. The context switcher retrieves the table entry associated with the actuator identifier of the second actuator and retrieves all child user context identifiers associated with that user context in step 522. In 524, the context switcher terminates the child user contexts with identifiers retrieved in step 522. In 526, the context switcher terminates the second user context and activates the first user context since the first user context was the previously active user context.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A computer-implemented method for context switching in enterprise resource planning tools comprising:
running a first user context operable within an enterprise resource planning system;
maintaining a user context table, the user context table including an entry for each child user context, each entry associating a child user context with a parent user context;
mapping, via a configuration program, each of a plurality of actuators of an input/output device to a context manipulation operation associated with a user context, the mapping being stored in a mapping table;
sending data associated with en a first actuator including an actuator identifier selected in response to user input and a first user context, the actuator in communication with a context switcher;

receiving the data associated with the first actuator by the context switcher;

the context switcher performing a context manipulation operation corresponding to the selected actuator in response to the data received so that the user may perform tasks in a second user context;

responsive to the context manipulation operation, the context switcher launching a new thread to encapsulate the second user context; and responsive to selection of a second actuator by the user, receive, at the context switcher, data from the second actuator including the actuator identifier and data identifying the user context active during the second actuator selection;

when the user context active during the second actuator selection is the first user context, perform a second context manipulation operation corresponding to the selected second actuator to deactivate the first user context and enable the user to perform tasks in a third user context associated with the selected second actuator;

when the user context active during the second actuator selection is the second user context, perform a third context manipulation operation corresponding to the selected second actuator to deactivate the second user context and enable the user to perform tasks in a fourth user context, the fourth user context being designated as a child user context of the second user context in the user context table; and responsive to completing performance of at least one of the context manipulation operations:

terminate, by the context switcher, the corresponding user context of the completed context manipulation operations and all child user contexts in the user context table that are associated with the user contexts of the completed context manipulation operations; and reactivate the deactivated user context(s) corresponding to the completed context manipulation operations.

2. The method for context switching in enterprise resource planning tools of claim 1 further comprising:

customizing the context manipulation operation performed in response to the actuator being actuated by using a configuration program.

3. The method for context switching in enterprise resource planning tools of claim 1 further comprising:

the context switcher performing the context manipulation operation of switching from the first user context to the second user context in response to the data associated with the actuator to allow the user to perform tasks in the second user context.

4. The method for context switching in enterprise resource planning tools of claim 1 further comprising:

the context switcher performing the context manipulation operation of switching from the second user context to the first user context and terminating the second user context in response to the data received from the actuator to allow the user to perform tasks in the first user context.

5. The method for context switching in enterprise resource planning tools of claim 1 further comprising:

the context switcher performing the context manipulation operations of activating the second user context and switching from the first user context to the second user context in response to the data associated with the actuator to allow the user to perform tasks in the second user context.

6. The method for context switching in enterprise resource planning tools of claim 1 further comprising:

the context switcher performs a context manipulation operation selected from the group comprising:

launching a call center application in response to the user pressing a "START" button;

displaying a summary record for a caller in response to the user pressing a "LAST NOTIFICATION" button;

expanding the summary record in response to the user pressing a "MORE" button; and terminating the call center application and all child user contexts in the user context table that are associated with the call center application in response to the user pressing a "DONE" button.

7. A context switching system for enterprise resource planning tools comprising:

an input/output device comprising a plurality of actuators;

a memory to store, in a mapping table, a customizable relationship between each of a plurality of user contexts and actuator identifiers associated with each of the plurality of actuators; and a processor to:

execute a first user context of the plurality of user contexts in which a user performs tasks;

maintain a user context table, the user context table including an entry for each child user context, each entry associating a child user context with a parent user context;

map, via a configuration program, each of the plurality of actuators to a context manipulation operation associated with a user context, the mapping being stored in the mapping table;

responsive to selection of a first actuator of the said input/output device by the user, receive, at a context switcher, data from the actuator including an actuator identifier and data identifying the executed first user context;

responsive to the received first actuator data and first user context, perform a first context manipulation operation corresponding to the selected first actuator and the first user context to deactivate the first user context and enable the user to perform tasks in a second user context associated with the selected first actuator;

responsive to the performed first context manipulation operation, launch, by the context switcher, a new thread to encapsulate the second user context;

responsive to selection of a second actuator of the input/output device by the user, receive, at the context switcher, data from the actuator including the actuator identifier and data identifying the user context active during the second actuator selection;

when the user context active during the second actuator selection is the first user context, perform a second context manipulation operation corresponding to the selected second actuator to deactivate the first user context and enable the user to perform tasks in a third user context associated with the selected second actuator;

when the user context active during the second actuator selection is the second user context, perform a third context manipulation operation corresponding to the selected second actuator to deactivate the second user context and enable the user to perform tasks in a fourth user context, the fourth user context being designated as a child user context of the second user context in the user context table; and responsive to completing performance of at least one of the context manipulation operations;

terminate, by the context switcher, the corresponding user context of the completed context manipulation operations and all child user contexts in the user context table that are associated with the user contexts of the completed context manipulation operations; and reactivate the deactivated user context(s) corresponding to the completed context manipulation operations.

8. The context switching system for enterprise resource planning tools of claim 7 further comprising:

a configuration program for customizing which of a plurality of context manipulation operations the context switcher performs in response to data received from the actuator.

9. The context switching system for enterprise resource planning tools of claim 7 further comprising:

the context switcher performing the context manipulation operation of switching from the second user context to the first user context and terminating the second user context in response to the data received from the actuator to allow the user to perform tasks in the first user context.

10. The context switching system for enterprise resource planning tools of claim 7 further comprising:

the context switcher performing the context manipulation operations of activating the second user context and switching from the first user context to the second user context in response to the data associated with the actuator to allow the user to perform tasks in the second user context.

11. The context switching system for enterprise resource planning tools of claim 7 further comprising:

the actuator is one of the members selected from the group comprising a button on a keyboard, a button on a mouse, a touchpad, an aural sensor, and a system that tracks eye movements.

12. The context switching system for enterprise resource planning tools of claim 7 further comprising:

the actuator is a button selected from the group comprising a "START" button that launches a call center application, a "LAST NOTIFICATION" button that displays a summary record for a caller, a "MORE" button that expands a summary record, and a "DONE" button that terminates the call center application and all child user contexts in the user context table that are associated with the call center application.

13. A context switching system for enterprise resource planning tools comprising:

input/output device means comprising a plurality of actuating means;

a memory to store, in a mapping table, a customizable relationship between each of a plurality of user contexts and actuating means identifiers associated with each of the plurality of actuating means; and a processor to:

execute a first user context of a plurality of user contexts in which a user performs tasks;

maintain a user context table, the user context table including an entry for each child user context, each entry associating a child user context with a parent user context;

map, via a configuration program, each of the plurality of actuating means to a context manipulation operation associated with a user context, the mapping being stored in the mapping table;

responsive to a selection of a first actuating means of said input/output device means by the user, receive, at a context switcher, data from the actuating means including an actuating means identifier and data identifying the executed first user context; and responsive to the received first actuating means and first user context data, perform a first context manipulation operation corresponding to the selected first actuating means and the first user context to deactivate the first user context and enable the user to perform tasks in a second user context associated with the selected first actuating means;

responsive to the performed first context manipulation operation, launch, by the context switcher, a new thread to encapsulate the second user context;

responsive to selection of a second actuating means of the input/output device by the user, receive, at the context switcher, data from the actuating means including the actuating means identifier and data identifying the user context active during the second actuating means selection;

when the user context active during the second actuating means selection is the first user context, perform a second context manipulation operation corresponding to the selected second actuating means to deactivate the first user context and enable the user to perform tasks in a third user context associated with the selected second actuating means;

when the user context active during the second actuating selection means is the second user context, perform a third context manipulation operation corresponding to the selected second actuating means to deactivate the second user context and enable the user to perform tasks in a fourth user context, the fourth user context being designated as a child user context of the second user context in the user context table; and responsive to completing performance of at least one context manipulation operation, terminate, by the context switcher, the corresponding user context of the completed context manipulation operations and all child user contexts in the user context table that are associated with the user contexts of the completed context manipulation operations; and reactivate the deactivated user context(s) corresponding to the completed context manipulation operations.

14. The context switching system for enterprise resource planning tools of claim 13 further comprising:

means for customizing which of a plurality of context manipulation operations the context switcher performs in response to data received from the actuator.

15. The context switching system for enterprise resource planning tools of claim 13 further comprising:

means for performing a context manipulation operation comprises switching from the second user context to the first user context and terminating the second user context in response to the data received from the actuator to allow the user to perform tasks in the first user context.

16. The context switching system for enterprise resource planning tools of claim 13 further comprising:

means for performing a context manipulation operation comprises activating the second user context and switching from the first user context to the second user context in response to the data associated with the actuator to allow the user to perform tasks in the second user context.

17. The context switching system for enterprise resource planning tools of claim 13 further comprising:

the actuator is one of the members selected from the group comprising a button on a keyboard, a button on a mouse, a touchpad, an aural sensor, and a system that tracks eye movements.

18. The context switching system for enterprise resource planning tools of claim 13 further comprising:
the actuator is a button selected from the group comprising a "START" button that launches a call center application, a "LAST NOTIFICATION" button that displays a summary record for a caller, a "MORE" button that expands a summary record, and a "DONE" button that terminates the call center application and all child user contexts in the user context table that are associated with the call center application.

* * * * *